(12) United States Patent
Ionkin et al.

(10) Patent No.: US 8,053,545 B2
(45) Date of Patent: Nov. 8, 2011

(54) PROCESSES FOR MAKING STABILIZED DIVALENT GERMANIUM AND TIN COMPOUNDS

(75) Inventors: Alex Sergey Ionkin, Kennett Square, PA (US); Brian M. Fish, Wilmington, DE (US); William J. Marshall, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 145 days.

(21) Appl. No.: 12/503,988

(22) Filed: Jul. 16, 2009

(65) Prior Publication Data

US 2009/0275723 A1 Nov. 5, 2009

Related U.S. Application Data

(62) Division of application No. 11/406,994, filed on Apr. 18, 2006, now Pat. No. 7,626,049.

(51) Int. Cl.
 *C08G 18/24* (2006.01)
 *C07F 7/30* (2006.01)
(52) U.S. Cl. .......................................... 528/51; 556/21
(58) Field of Classification Search ............... 528/51
 See application file for complete search history.

(56) References Cited

U.S. PATENT DOCUMENTS

| | | |
|---|---|---|
| 6,187,711 B1 | 2/2001 | Bernard et al. |
| 7,371,879 B2 | 5/2008 | Ionkin |
| 2007/0243390 A1 | 10/2007 | Ionkin |
| 2007/0244292 A1 | 10/2007 | Ionkin |

OTHER PUBLICATIONS

Advanced Inorganic Chemistry: A Comprehensive Text, 4th Edition, p. 381, 1980.*
Ivan J. Boyer, Toxicity of Dibutyltin, Tributyltin and Other Organotin Compounds to Humans and to Experimental Animals, Toxicology, 1989, vol. 55:253-298.
Thomas F. Lytle et. al., Life-Cycle Toxicity of Dibutyltin to the Sheepshead Minnow (Cyprinodon Variegatus) and Implications of the Ubiquitous Tributyltin Impurity in Test Material, Appl. Organomet. Chem., 2003, vol. 17:653-661.
Bernard Jousseaume et. al., Air Activated Organtoin Catalysts for Silicone Curing and Polyurethane Preparation, Organometallics, 1994, vol. 13:1034-1038.
U.S. Appl. No. 11/407,007, filed Apr. 18, 2006, Alex Ionkin.
U.S. Appl. No. 11/407,009, filed Apr. 18, 2006, Alex Ionkin.
U.S. Appl. No. 11/407,003, filed Nov. 11, 2006, Alex Ionkin.

* cited by examiner

*Primary Examiner* — Randy Gulakowski
*Assistant Examiner* — Jeffrey Washville

(57) ABSTRACT

Processes for making ivalent germanium and tin compounds are provided. The divalent germanium and tin compounds have been found to be efficient catalysts for the formation of polyurethanes.

6 Claims, 2 Drawing Sheets

ORTEP drawing of tin(II), *trans*-bis[3-(di-*tert*-butylphosphino)-1,1,1-trifluoro-2-(trifluoromethyl)-2-propanolato-O,P]-,.

Figure 1. ORTEP drawing of tin(II), *trans*-bis[3-(di-*tert*-butylphosphino)-1,1,1-trifluoro-2-(trifluoromethyl)-2-propanolato-O,P}-,.
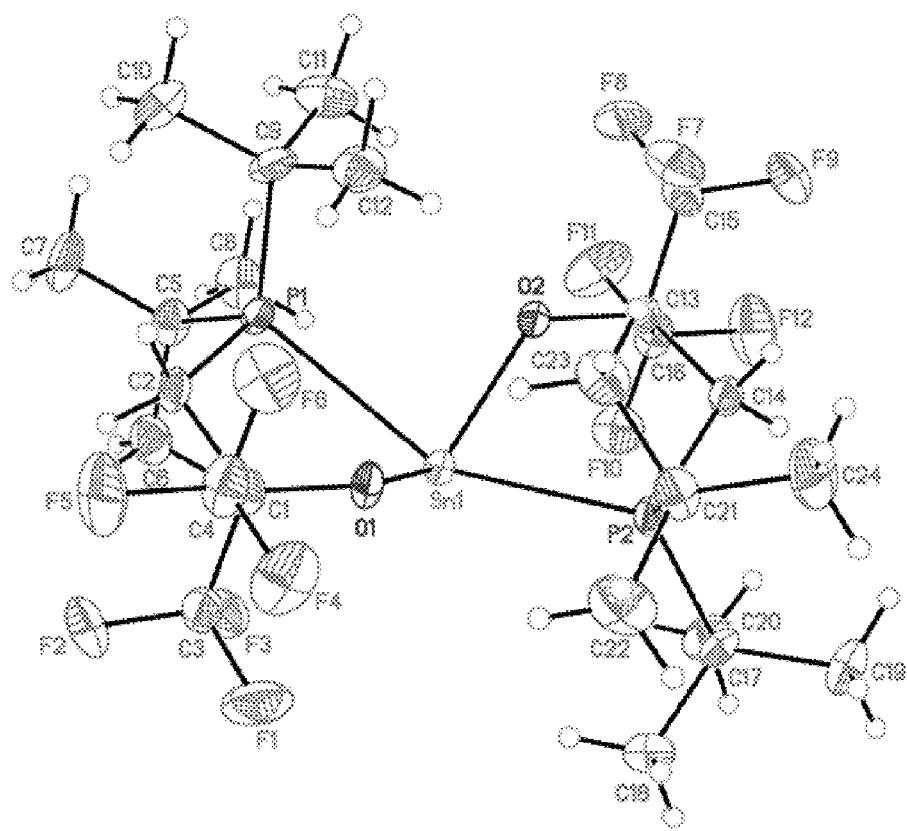

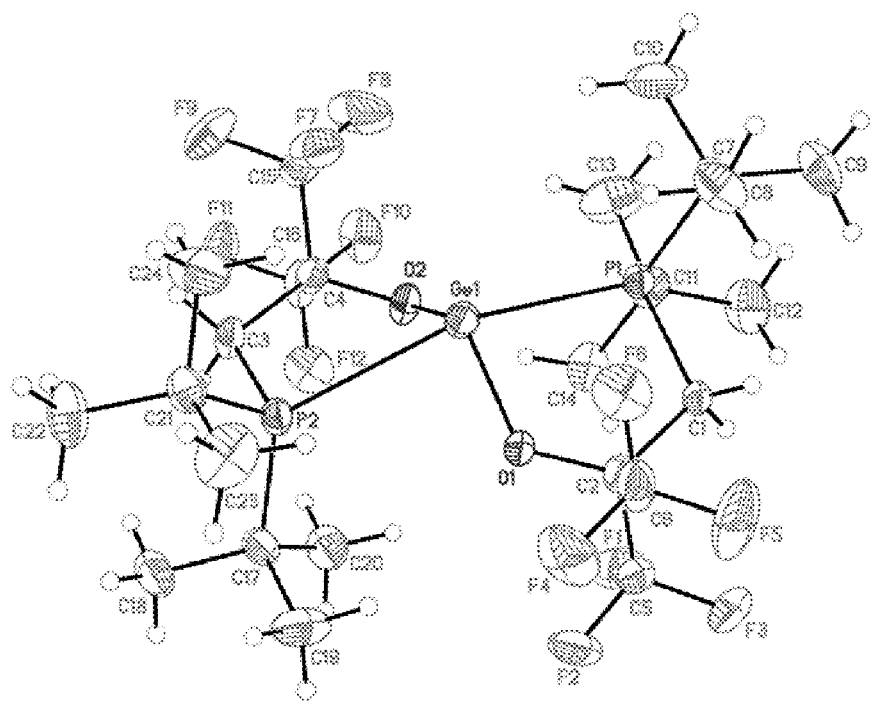
Figure 2. ORTEP drawing of germanium(II), *trans*-bis[3-(di-*tert*-butylphosphino)-1,1,1-trifluoro-2-(trifluoromethyl)-2-propanolato-O,P]-,.

PROCESSES FOR MAKING STABILIZED DIVALENT GERMANIUM AND TIN COMPOUNDS

FIELD OF THE INVENTION

The present invention relates to processes for making novel divalent germanium and tin compounds that are stabilized by sterically bulky P^O ligands.

BACKGROUND

Coating manufacturers have achieved significant progress in developing novel components for polyurethanes to improve coating properties, although a need remains for novel catalyst systems. The usual catalysts for forming polyurethanes are dibutyltindilaurate and tertiary amines. Dialkyl and trialkyltin derivatives, classes of the compounds to which dibutyltindilaurate belongs, have been discussed as having some issues regarding human toxicity. See, for example, Boyer, I. J., *Toxicology*, 1989, 55, 253 and Lytle, T. F.; Manning, C. S.; Walker, W. W.; Lytle, J. S.; Page, D. S., *Appl. Organomet. Chem.*, 2003, 17, 653. Divalent tin compounds as disclosed herein, which do not have alkyl-tin bonds, have now been found to be suitable as catalysts for polyurethane formation.

Organometallics of the group 14 elements, particularly dibutyltin derivatives, are known to catalyze transesterification, transcarbamoylation and urethane formation. While there has been progress in development of novel components for polyurethanes to improve coating properties, a need remains for novel catalyst systems. Typical catalysts for processes including transesterification, transcarbamolylation and urethane formation are dibutyltindilaurate and tertiary amines. Dialkyl and trialkyltin derivatives, classes of the compounds to which dibutyltindilaurate belongs, have some toxicity to humans; therefore, less toxic catalysts are desired.

Jousseaume, B. et al., ("Air Activated Organotin Catalysts for Silicone Curing and Polyurethane Preparation" (1994) Organometallics 13:1034), and Bernard, J. M. et al. (U.S. Pat. No. 6,187,711) describe the use of distannanes as latent catalysts.

Co-owned and co-pending U.S. Pat. Applications (CL-3191, CL-3464 and CL-3193), all hereby incorporated by reference in their entirety, describe different classes of tin and germanium compounds useful as catalysts. (CL-3191) describes divalent tin compounds stabilized by phenoxy groups with bulky ortho-substituents. (CL-3193) describes quadrivalent tin and germanium compounds containing more than one triorganylsilyl groups connected to tin or germanium.

SUMMARY OF THE INVENTION

The present invention provides, in some embodiments, a compound having formula:

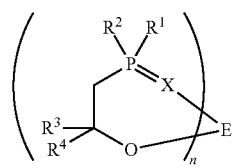

wherein
E is tin (Sn) or germanium (Ge);
X is oxygen, sulfur, nitrogen, substituted N, or a lone pair of electrons;
n is 1 or 2;
$R^1$ and $R^2$ are each independently H, C-4 to C-50 alkyl, C-6 to C-50 aryl, silyl, C-4 to C-50 substituted arylalkyl, C-6 to C-50 substituted alkylaryl, alkoxy, dialkylamino, or alkythio; and
$R^3$ and $R^4$ are each independently C-1 to C-20 alkyl, or C-1 to C-20 fluoroalkyl.

Further provided in some embodiments of the present invention is a process for making a divalent tin compound of the formula

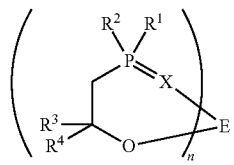

wherein E is tin (Sn);
X is oxygen, sulfur, nitrogen, substituted N, or a lone pair of electrons;
n is 1 or 2;
$R^1$ and $R^2$ are each independently H, C-4 to C-50 alkyl, C-6 to C-50 aryl, silyl, C-4 to C-50 substituted arylalkyl, C-6 to C-50 substituted alkylaryl, alkoxy, dialkylamino, or alkythio; and
$R^3$ and $R^4$ are each independently C-1 to C-20 alkyl, or C-1 to C-20 fluoroalkyl;
said process comprising:
providing a phosphine substituted with one or more sterically hindered group, and a substituted tin II compound;
combining said phosphine and said tin(II) compound in the presence of a solvent; and
isolating the resulting divalent tin compound.

Further provided in some of the embodiments of the present invention is a process for making a divalent germanium compound of the formula

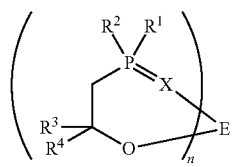

wherein E is germanium (Ge);
X is oxygen, sulfur, nitrogen, substituted N, or a lone pair of electrons;
n is 1 or 2;
$R^1$ and $R^2$ are each independently H, C-4 to C-50 alkyl, C-6 to C-50 aryl, silyl, C-4 to C-50 substituted arylalkyl, C-6 to C-50 substituted alkylaryl, alkoxy, dialkylamino, or alkythio; and
$R^3$ and $R^4$ are each independently C-1 to C-20 alkyl, or C-1 to C-20 fluoroalkyl;
said process comprising:
providing a phosphine substituted with one or more sterically hindered group, and a substituted germanium II compound;
combining said phosphine and said germanium (II) compound in the presence of a solvent; and
isolating the resulting divalent germanium compound.

Still further provided in some of the embodiments of the present invention are processes for producing polyurethanes by combining isocyanate-comprising materials with isocyanate-reactive materials in the presence of compounds of the present invention, used as catalysts.

BRIEF DESCRIPTION OF THE DRAWINGS

FIG. 1 shows an ORTEP drawing of tin(II), trans-bis[3-(di-tert-butylphosphino)-1,1,1-trifluoro-2-(trifluoromethyl)-2-propanolato-O,P]—.

FIG. 2 shows an ORTEP drawing of germanium(II), trans-bis[3-(di-tert-butylphosphino)-1,1,1-trifluoro-2-(trifluoromethyl)-2-propanolato-O,P]—.

DETAILS OF THE INVENTION

The present invention provides, in some embodiments, novel tin and germanium compounds. The invention also provides, in other embodiments, processes for making the novel tin and germanium compounds, and polymerization processes using the compounds. The new compounds do not have direct alkyl bonds, which are usually associated with higher-than-desired human toxicity, making them desirable candidates for use as catalysts in polyurethane formation.

It has been discovered that a sterically bulky phosphine can be used as a starting material to form the aforesaid novel tin and germanium materials. The catalysts of the present invention comprise sterically hindered groups. Sterically hindered groups are generally "bulky", as will be recognized herein by those skilled in the art, and as used herein, the term refers to compounds having a spatial arrangement of their atoms such that most reactions with another molecule are prevented or retarded.

The compounds of the present invention are of the general formula

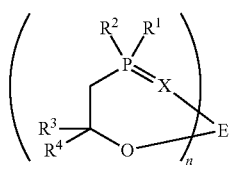

A where E is tin (Sn) or germanium (Ge); X is oxygen (O), sulfur (S), nitrogen (N) or substituted N, or a lone pair of electrons; n is 1 or 2; $R^1$ and $R^2$ are each independently H, C-4 to C-50 alkyl, C-6 to C-50 aryl, silyl, C-4 to C-50 substituted arylalkyl, C-6 to C-50 substituted alkylaryl, alkoxy, dialkylamino, or alkythio; $R^3$ and $R^4$ are each independently C-1 to C-20 alkyl, or C-1 to C-20 fluoroalkyl.

Typically, R1, R1', R2 and R2' are tert-butyl or phenyl. When X is substituted N, the substituents can be C-1 to C-10 alkyl and =N—N=N-Ad, where Ad represents an adamantyl group:

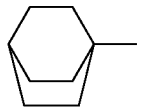

When n is 2 in the formula above, the structure can appear as

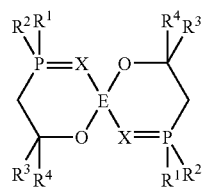

B where E is tin (Sn) or germanium (Ge); X is oxygen (O), sulfur (S), nitrogen (N) or a lone pair of electrons; n is 1 or 2; $R^1$, $R^{1'}$, $R^2$ and $R^{2'}$ are each independently H, C-4 to C-50 alkyl, C-6 to C-50 aryl, silyl, C-4 to C-50 substituted arylalkyl, C-6 to C-50 substituted alkylaryl, alkoxy, dialkylamino, or alkythio; $R^3$, R3', $R^4$ and $R^{4'}$ are each independently C-1 to C-20 alkyl, or C-1 to C-20 fluoroalkyl. Typically, R1, R1', R2 and R2' are tert-butyl or phenyl. When X is substituted N, the substituents can be C-1 to C-10 alkyl alkyl or aryl, including =N—N=N-Ad, where Ad represents an adamantyl group:

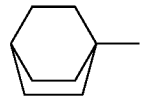

While the formula above shows the phosphorus-containing ligands arranged around E in a "trans" formation, they can also be arranged around E in a "cis" formation. Because the substituents can be different, the compounds can be symmetric and non-symmetric in nature.

A general scheme, below, shows the reaction of the ($^t$Bu)$_2$PCH$_2$(CF$_3$)$_2$OH with bis[bis(trimethylsilyl)amino]tin(II) (structure 1 below) to give tin(II), trans-bis[3-(di-tert-butylphosphino)-1,1,1-trifluoro-2-(trifluoromethyl)-2-propanolato-O,P]— (structure 2 below). The reaction generally takes place in the presence of a solvent, typically toluene, and the final product is generally recrystallized in the presence of a solvent, generally non-polar C-4 to C-20 hydrocarbon solvents, typically pentene, before X-ray crystallographic analysis.

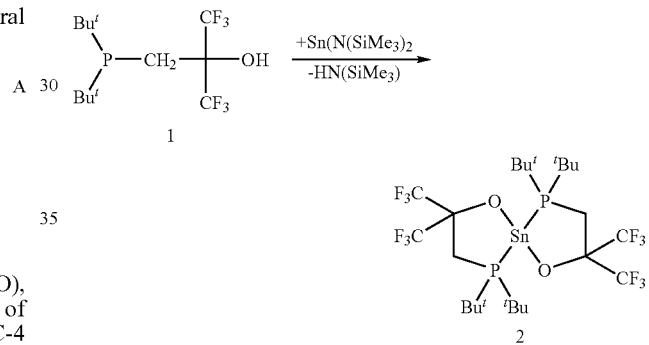

The resulting divalent tin compound 2 can subsequently be reacted with sulfur to form the compound 3, tin(II), trans-bis[3-(di-tert-butylphosphinothioyl)-1,1,1-trifluoro-2-(trifluoromethyl)-2-propanolato-κO, κS]—, shown in the scheme below. This reaction is demonstrated in Example 2 below.

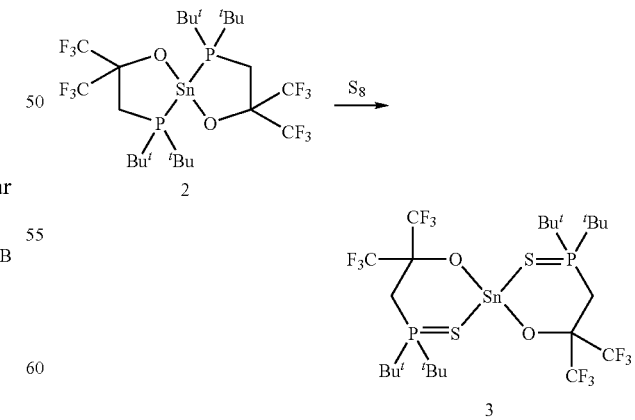

Other reactions of the divalent tin compound 2 have been demonstrated. 1-Azidoadamantane reacts with compound 2 also on the phosphorus centers. Only mono-adduct 4 was formed in this reaction. Addition of the second molecule of 1-azidoadamantane did not take place even upon heating the reaction mixture at 100° C. for 2 weeks. Therefore, non-symmetrical structures can be obtained.

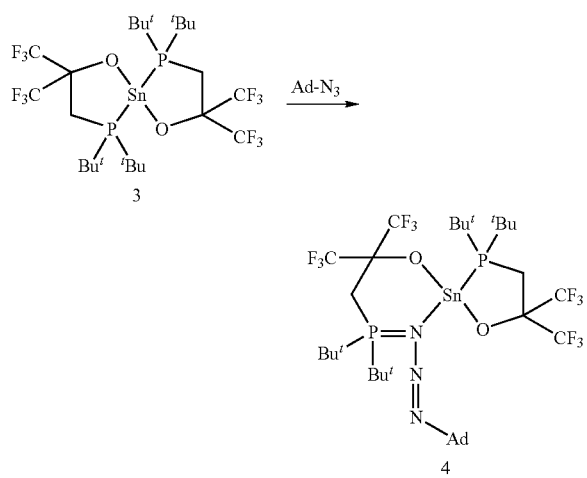

In likewise fashion, sterically bulky phosphine compounds can be used to synthesize germanium complexes. The reaction between lithium salt of 2-[(di-tert-butyl-phosphanyl)methyl]-1,1,1,3,3,3-hexafluoropropan-2-ol (obtained by reacting di-tert-butyl phosphine with butyl lithium, and subsequent reaction with 2,2-bis-trifluoromethyl-oxirane) and germanium(II) chloride dioxane complex was used to prepare the divalent germanium compound 6 supported by two P^O chelating five-membered rings, as shown in the scheme below. As used herein, P^O represents a series of atoms and bonds, with P on one end and O on the other, where other atom(s) may or may not be present between. P^O therefore represents the atoms that are important for coordination as it identifies the coordination points (P and O).

As described in the examples below, in general, when E is Sn in formula A above, the compound can be made by adding a generally an alkyl alcohol to a dialkyl tin compound of the general formula $Sn(-N(R^2))_2$, where R is C-1 to C-20 alkyl, compound to give $(RO)_2Sn$ material. Also, in general, when E is Ge in formula A above, the compound can be made by adding generally a C1-C20 alkyl Lithium oxide (R—OLi) to a substituted or unsubstituted Germanium chloride ($GeCl_2$) to give $(RO)_2Ge$ material.

The process reactions described herein can take place at any convenient temperature, generally between 0 degrees C. and 120 degrees C., and preferably between 60 degrees C. and 80 degrees C. Any convenient pressure can be used, with ambient pressure preferred.

The production of polyurethane is usually achieved by addition of polymeric polyols to isocyanates. Polyols are generally defined as polymeric or oligomeric organic species with at least two hydroxy functionalities. A schematic of a polyol used herein is shown below as structure 7. Unless otherwise stated, the term "polyol", when used herein with regard to processes for making polyurethanes, refers to the polyol having structure 7. The polyol is available from DuPont, Wilmington, Del.

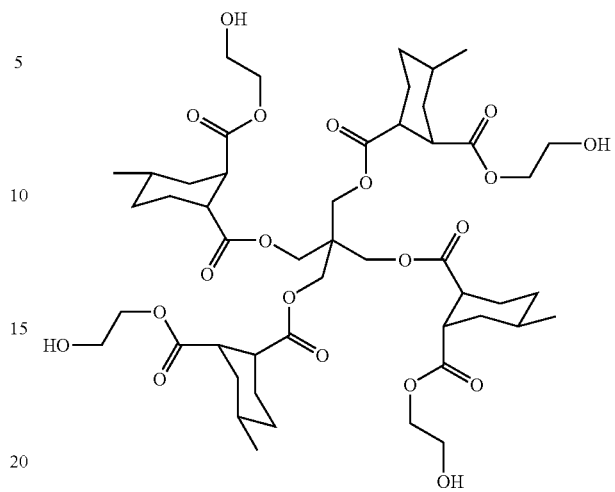

The starting Polyol may be either a low molecular weight oligomer (generally from about 500 to 3000 wt. avg. molecular weight, preferably from about 600 to about 2000 wt. avg. molecular weight) or a polymer with OH functionality (generally from about 2000 to about 300,000 wt. avg. molecular weight, preferably from about 2500 to about 100,000 wt. avg. molecular weight, and more preferably from about 2500 to about 50,000 wt. avg. molecular weight.

The production of a polyurethane may also use other isocyanate-reactive compounds, including but not limited to alcohols, amines, thiols and combinations thereof.

An example of the isocyanate with functional groups capable of reacting with hydroxyl is as follows:

$$(O=C=N)_{n>2}R_5$$

wherein $R_5$ is a alkyl structure, such as, for example, ethyl, propyl, phenyl and the like. In some preferred embodiments, $R_5$ is $(CH_2)_6$.

Examples of isocyanates suitable for use in producing polyurethanes include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate.

Additional examples of suitable polyisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane4,4'-diisocyanate, a toluene diisocyanate, 1,3-bis(1-isocyanato1-methylethyl)benzene, 1,4-bis(1-isocyanato-1-methylethyl)benzene, 1,3-bis(isocyanatomethyl)benzene, xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, polyisocyanates having isocyanaurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water (available under the trademark Desmodur® N from Bayer Corporation of Pittsburgh, Pa.), the adduct of 1 molecule of trimethylol propane and 3 molecules of toluene diisocyanate (available under the trademark Desmodur® L from Bayer Corporation), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate. Other isocyanate-comprising materials can be used, including but not limited to thioisocyanates, selenium isocyanates, carbodiimides (R—N=C=N—R) and the like A specific example of an isocyanate capable of reacting with hydroxyl groups is Desmodur® 3300 isocyanate, available from Bayer. Desmodur® 3300 as available commercially, comprises a mixture of compounds, with a general structure as follows (also, pentamer, heptamer and higher molecular weight species can be present):

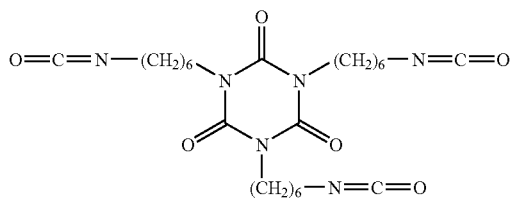

It is preferred that the compositions made before reaction with the catalyst be of relatively low molecular weight (generally less than about 50,000 wt. avg. molecular weight so as to keep the viscosity of the compositions before crosslinking low, and therefore avoid or minimize the need for solvent(s).

Other materials, which may be present in the compositions and processes, include one or more solvents (and are meant to act only as solvents). These preferably do not contain groups such as hydroxyl or primary or secondary amino.

The tin and geranium compounds as prepared herein were tested as catalysts for polyurethane formation. Two important parameters were recorded: gel time under anaerobic conditions (under nitrogen) and gel time under aerobic conditions. The so-called "gel time" corresponded to the time in hours following activation at which flow is no longer observed in a coating mixture. The "gel time" demonstrates "latency", wherein the materials formed would still be sprayable as coatings, and would be attractive for the refinish automotive market. The results of the application of novel divalent tin and germanium compounds in the catalytic formation of polyurethanes are shown in the Table in the Examples below. Generally, when the catalysts of some of the embodiments of the present invention are used to produce polyurethanes, gel times increase from 2 to 50 times under nitrogen, and 3 to 40 times under aerobic (air) conditions, compared to those of polyurethanes made without catalysts expressed in some of the embodiments of the present invention.

Crosslinked polyurethanes prepared according to the processes disclosed herein are useful, for example, as encapsulants, sealants, and coatings, especially transportation (automotive) and industrial coatings. As transportation coatings, the present compositions are useful as both OEM (original equipment manufacturer) and automotive refinish coatings. They may also be used as primer coatings. They often cure under ambient conditions to tough hard coatings and may be used as one or both of the so-called base coat and clear coat automotive coatings. This makes them particularly useful for repainting of transportation vehicles in the field.

Depending on use, the compositions and the materials used in the present processes may contain other materials. For example, when used as encapsulants and sealants, the compositions may contain fillers, pigments, and/or antioxidants.

When used as coatings, the present compositions contain typically added ingredients known in the art, which are described below. In particular there may be other polymers (especially of low molecular weight, "functionalized oligomers") which are either inert or have functional group other than hydroxyl or isocyanate and also react with other reactive materials in the coating composition.

Representative of the functionalized oligomers that can be employed as components or potential crosslinking agents of the coatings are the following:

Hydroxyl oligomers: The reaction product of multifunctional alcohols such as pentaerythritol, hexanediol, trimethylol propane, and the like, with cyclic monomeric anhydrides such as hexahydrophthalic anhydride, methylhexahydrophthalic anhydride, and the like produce acid oligomers. These acid oligomers are further reacted with monofunctional epoxies such as butylene oxide, propylene oxide, and the like to form hydroxyl oligomers.

Silane oligomers: The above hydroxyl oligomers further reacted with isocyanato propyltrimethoxy silane.

Epoxy oligomers: The diglycidyl ester of cyclohexane dicarboxylic acid, such as Araldite® CY-184 from Ciba Geigy, and cycloaliphatic epoxies, such as ERL®-4221, and the like from Union Carbide.

Aldimine oligomers: The reaction product of isobutyraldehyde with diamines such as isophorone diamine, and the like.

Ketimine oligomers: The reaction product of methyl isobutyl ketone with diamines such as isophorone diamine.

Melamine oligomers: Commercially available melamines such as CYMEL® 1168 from Cytec Industries, and the like.

AB-Functionalized oligomers: Acid/hydroxyl functional oligomers made by further reacting the above acid oligomers with 50%, based on equivalents, of monofunctional epoxy such as butylene oxide or blends of the hydroxyl and acid oligomers mentioned above or any other blend depicted above.

CD-Functionalized Crosslinkers: Epoxy/hydroxyl functional crosslinkers such as the polyglycidyl ether of Sorbitol DCE-358® from Dixie Chemical or blends of the hydroxyl oligomers and epoxy crosslinkers mentioned above or any other blend as depicted above.

The compositions of this invention may additionally contain a binder of a noncyclic oligomer, i.e., one that is linear or aromatic. Such noncyclic oligomers can include, for instance, succinic anhydride- or phthalic anhydride-derived moieties in hydroxyl oligomers.

Preferred functionalized oligomers have weight average molecular weight not exceeding about 3,000 with a polydispersity not exceeding about 1.5; more preferred oligomers have molecular weight not exceeding about 2,500 and polydispersity not exceeding about 1.4; most preferred oligomers have molecular weight not exceeding about 2,200, and polydispersity not exceeding about 1.25. Other additives also include polyaspartic esters, which are the reaction product of diamines, such as, isopherone diamine with dialkyl maleates, such as, diethyl maleate.

The coating compositions may be formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

The coating compositions can also contain a binder of an acrylic polymer of weight average molecular weight greater than 3,000, or a conventional polyester such as SCD®-1040 from Etna Product Inc. for improved appearance, sag resistance, flow and leveling and such. The acrylic polymer can be composed of typical monomers such as acrylates, methacrylates, styrene and the like and functional monomers such as hydroxy ethyl acrylate, glycidyl methacrylate, or gamma methacrylylpropyl trimethoxysilane and the like.

The coating compositions can also contain a binder of a dispersed acrylic component which is a polymer particle dispersed in an organic media, which particle is stabilized by what is known as steric stabilization. Hereafter, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 microns. The arms, attached to the core, make up about 10 to 90%, preferably 10 to 59%, by weight of the dispersed polymer, and have a weight average molecular weight of about 1,000 to 30,000, preferably 1,000 to 10,000. The macromolecular core of the dispersed polymer is comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane-containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. Optionally, the macromolecular core can be crosslinked through the use of diacrylates or dimethacrylates such as allyl methacrylate or post reaction of hydroxyl moieties with polyfunctional isocyanates. The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

The coating compositions can also contain conventional additives such as pigments, stabilizers, rheology control agents, flow agents, toughening agents and fillers. Such additional additives will, of course, depend on the intended use of the coating composition. Fillers, pigments, and other additives that would adversely affect the clarity of the cured coating may not typically be included if the composition is intended as a clear coating.

The coating compositions are typically applied to a substrate by conventional techniques such as spraying, electrostatic spraying, roller coating, dipping or brushing. The present formulations are particularly useful as a clear coating for outdoor articles, such as automobile and other vehicle body parts. The substrate is generally prepared with a primer and or a color coat or other surface preparation prior to coating with the present compositions.

A layer of a coating composition is cured under ambient conditions in the range of 30 minutes to 24 hours, preferably in the range of 30 minutes to 3 hours to form a coating on the substrate having the desired coating properties. One of skill in the art appreciates that the actual curing time depends upon the thickness of the applied layer and on any additional mechanical aids, such as, fans that assist in continuously flowing air over the coated substrate to accelerate the cure rate. If desired, the cure rate may be further accelerated by baking the coated substrate at temperatures generally in the range of from about 60° C. to 150° C. for a period of about 15 to 90 minutes. The foregoing baking step is particularly useful under OEM (Original Equipment Manufacture) conditions.

The compounds and processes disclosed herein can be used for making coating compositions and generally in applications wherein curing of polyurethane is required, for example in the adhesives industry and related applications. The compositions are also suitable as clear or pigmented coatings in industrial and maintenance coating applications.

A coating composition made using the catalysts is suitable for providing coatings on variety of substrates, particularly for providing clear coatings in automotive OEM or refinish applications typically used in coating auto bodies. The coating composition can be formulated in the form of a clear coating composition, pigmented composition, metallized coating composition, basecoat composition, monocoat composition or a primer. The substrate is generally prepared with a primer and or a color coat or other surface preparation prior to coating with the present compositions.

Suitable substrates to which the coating compositions can be applied include automobile bodies, items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, bicycles, boats, and aircraft. Other suitable substrates for coating include industrial and commercial new construction and maintenance thereof; cement and wood floors; walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; golf balls; and sporting equipment.

EXAMPLES

All air-sensitive compounds were prepared and handled under a $N_2$/Ar atmosphere using standard Schlenk and inert-atmosphere box techniques. Anhydrous solvents were used in the reactions. Solvents were distilled from drying agents or passed through columns under an argon or nitrogen atmosphere. 1-Azidoadamantane, sulfur, bis[bis(trimethylsilyl)amino]tin(II), germanium(II) chloride dioxane complex (1:1), and n-butanol were purchased from Aldrich Chemical Co., Milwaukee, Wis. Unless otherwise specified, all other chemicals and reagents were also obtained from Aldrich Chemical Co.

As used in the following examples, "Polyol" means a compound having the structure 7 shown above. Unless otherwise stated, the polyol was used as 50% solids dissolved in methyl amyl ketone, butyl acetate, and propylene glycol methyl ether acetate.

The isocyanate species used in the examples below was Desmodur® 3300A, an oligomer of hexamethylene diisocyanate which is commercially available from Bayer Incorporated, 100 Bayer Road, Pittsburgh, Pa. 15205-9741.

Example 1

Tin(II), trans-bis[3-(di-tert-butylphosphino)-1,1,1-trifluoro-2-(trifluoromethyl)-2-propanolato-O,P]—

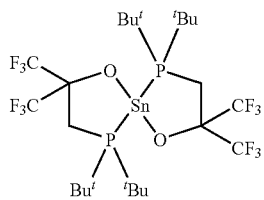

15.62 g (0.048 mol) of 2-[(Di-tert-butyl-phosphanyl)methyl]-1,1,1,3,3,3-hexafluoropropan-2-ol was dissolved in 200 ml of toluene. 9.5 g (0.022 mol) of Bis[bis(trimethylsilyl)amino]tin(II) was added dropwise in above solution. The reaction mixture was stirred for 24 hours and the solvent and formed bis(trimethylsilyl)amine were removed in 1-mm vacuum. The residue was recrystallized from 50 ml of pentane at −30° C. Yield of tin(II), trans-bis[3-(di-tert-butylphosphino)-1,1,1-trifluoro-2-(trifluoromethyl)-2-propanolato-O,P]—, was 12.71 g (76%) as a white solid with m.p. 207.6° C. (decomposition). $^1$H NMR (500 MHz, $C_6D_6$, TMS): δ 1.00 (s, 36H, Me), 2.10 (s, 4H, $CH_2$). $^{19}$F NMR (500 MHz, Tol-$D_8$): δ −76.85 (s, 12F). $^{31}$P NMR (500 MHz, Tol-$D_8$): δ 18.2 ($^1J_{P119Sn}$=865.36 Hz, $^1J_{P117Sn}$=827.18 Hz). $^{119}$Sn NMR (400 MHz, $C_6D_6$, Me$_4$Sn): δ −292.0 (br, 1Sn). Anal. Calculated for $C_{24}H_{40}F_{12}O_2P_2Sn$ (Mol. Wt.: 769.21): C, 37.47; H, 5.24. Found: C, 37.54; H, 5.27. The structure was proven by X-ray analysis.

Example 2

Tin(II), trans-bis[3-(di-tert-butylphosphinothioyl)-1,1,1-trifluoro-2-(trifluoromethyl)-2-propanolato-κO, κS]—

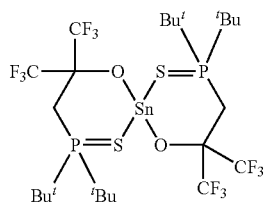

3.0 g (0.0039 mol) of Tin(II), trans-bis[3-(di-tert-butylphosphino)-1,1,1-trifluoro-2-(trifluoromethyl)-2-propanolato-O,P]— (example 1) and 0.27 g (0.0086 mol) of sulfur were stirred in 200 ml of toluene at room temperature for 48 hours. The solvent was removed in 1-mm vacuum and the residue was recrystallized from 50 ml of pentane. Yield of tin(II), trans-bis[3-(di-tert-butylphosphinothioyl)-1,1,1-trifluoro-2-(trifluoromethyl)-2-propanolato-κO, κS]—, was 3.14 g (97%) as a white solid with m.p. 204.5° C. (decomposition). $^1$H NMR (500 MHz, $C_6D_6$, TMS): δ 1.00 (s, 36H, Me), 2.30 (s, 4H, $CH_2$). $^{19}$F NMR (500 MHz, $C_6D_6$): δ −76.30 (s, 12F). $^{31}$P NMR (500 MHz, THF-$D_8$): δ 67.11 ($^2J_{P119Sn}$=114.4 Hz). $^{119}$Sn NMR (400 MHz, THF-$D_8$, Me$_4$Sn): δ −489.3 (br, 1Sn). Anal. Calculated for $C_{24}H_{40}F_{12}O_2P_2S_2Sn$ (Mol. Wt.: 833.34): C, 34.59; H, 4.84. Found: C, 34.72; H, 5.03. The structure was proven by X-ray analysis.

Example 3

2-(Di-tert-butyl-phosphinoylmethyl)-1,1,1,3,3,3-hexafluoro-propan-2-ol 1.0 g (0.0013 mol) of Tin(II), trans-bis[3-(di-tert-butylphosphino)-1,1,1-trifluoro-2-(trifluoromethyl)-2-propanolato-O,P]—, (example 1) was dissolved in 50 ml of methylene chloride, then 1.0 g of the 30% solution of hydrogen peroxide was added in the above solution. After 1 hour, the organic phase was separated, dried over magnesium sulfate over night. The solvent was removed in 1-mm vacuum and the residue was recrystallized from 10 ml of pentane. Yield of 2-(di-tert-butyl-phosphinoylmethyl)-1,1,1,3,3,3-hexafluoro-propan-2-ol]-, was 0.71 g (80%) as a white solid with m.p. 87.5° C. (with sublimation). $^1$H NMR (500 MHz, THF-$D_8$, TMS): δ 1.12 (d, $^3J_{P,H}$=13.4 Hz, 18H, Me), 2.30 (d, $^3J_{P,H}$=3.7 Hz, 2H, $CH_2$). $^{19}$F NMR (500 MHz, THF-$D_8$): δ −81.20 (s, 12F). $^{31}$P NMR (500 MHz, THF-$D_8$): δ 64.95 (s, 1P). Anal. Calculated for $C_{12}H_{21}F_6O_2P$ (Mol. Wt.: 342.26): C, 42.11; H, 6.18; P, 9.05. Found: C, 42.25; H, 6.22; P, 9.13. The structure was proven by X-ray analysis.

Example 4

Synthesis of Tin(II), trans-[3-(di-tert-butylphosphino)-1,1,1-trifluoro-2-(trifluoromethyl)-2-propanolato-O,P], [3-(di-tert-butyl-(phosphinoyl)-1,1,1-trifluoro-2-(trifluoromethyl)-2-propanolato-κO, κN]— and Tin(II), trans-bis[3-(di-tert-butylphosphinoyl)-1,1,1-trifluoro-2-(trifluoromethyl)-2-propanolato-κO, κS]—

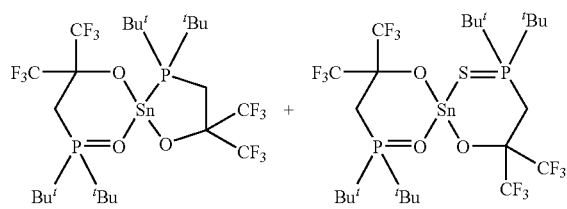

3.0 g (0.0039 mol) of Tin(II), trans-bis[3-(di-tert-butylphosphino)-1,1,1-trifluoro-2-(trifluoromethyl)-2-propanolato-O,P]—, (example 1) and 4.05 g (0.043 mol) of pyridine-N-oxide were stirred in 200 ml of toluene at 100° C. for 5 weeks. According to $^{31}$P NMR 20% of the starting compound was consumed to give two new signals in about 2 to 1 ratio. Tin(II), trans-[3-(di-tert-butylphosphino)-1,1,1-trifluoro-2-(trifluoromethyl)-2-propanolato-O,P], [3-(di-tert-butyl-(phosphinoyl)-1,1,1-trifluoro-2-(trifluoromethyl)-2-propanolato-κO, κN]—, has following chemical shifts $^{31}$P NMR (500 MHz, THF-D$_8$): δ 64.8 (d, $^3J_{PP}$=18.7 Hz, $^2J_{P119Sn}$=118.9 Hz, 1P, P=O), 19.9 (d, $^3J_{PP}$=18.7 Hz, $^1J_{P119Sn}$=270.8 Hz, 1P). Tin(II), trans-bis[3-(di-tert-butylphosphinoyl)-1,1,1-trifluoro-2-(trifluoromethyl)-2-propanolato-κO, κS]—, has following chemical shifts $^{31}$P NMR (500 MHz, THF-D$_8$): δ 60.7 ($^2J_{P119Sn}$=96.33 Hz).

Example 5

Tin(II), trans-[3-(di-tert-butylphosphino)-1,1,1-trifluoro-2-(trifluoromethyl)-2-propanolato-O,P], [3-(P,P-di-tert-butyl-N-(diazo-adamantyl)phosphinimyl)-1,1,1-trifluoro-2-(trifluoromethyl)-2-propanolato-κO, κN]—

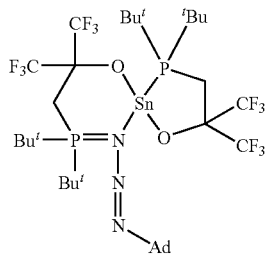

3.0 g (0.0039 mol) of Tin(II), trans-bis[3-(di-tert-butylphosphino)-1,1,1-trifluoro-2-(trifluoromethyl)-2-propanolato-O,P]—, (example 1) and 0.63 g (0.0041 mol) of 1-azidoadamantane were stirred in 200 ml of toluene at room temperature for 5 days. The solvent was removed in 1-mm vacuum and the residue was recrystallized from 50 ml of pentane. Yield of tin(II), trans-[3-(di-tert-butylphosphino)-1,1,1-trifluoro-2-(trifluoromethyl)-2-propanolato-O,P], [3-(P,P-di-tert-butyl-N-(diazo-adamantyl)phosphinimyl)-1,1,1-trifluoro-2-(trifluoromethyl)-2-propanolato-κO, κN]—, was 3.20 g (87%) as a slight yellow solid with m.p. 167.7° C. (decomposition). In the structure above, Ad represents an adamantyl group. $^1$H NMR (500 MHz, C$_6$D$_6$, TMS): δ 1.05 (d, $^3J_{P,H}$=13.8 Hz, 9H, Me), 1.16 (d, $^3J_{P,H}$=13.8 Hz, 9H, Me), 1.20 (d, $^3J_{P,H}$=14.7 Hz, 9H, Me), 1.35 (d, $^3J_{P,H}$=14.4 Hz, 9H, Me), 1.63 (m, 6H, Adamantyl), 1.90 (m, 6H, Adamantyl), 2.05 (m, 3H, Adamantyl), 2.40 (m, 2H, P—CH$_2$), 2.30 (m, 2H, P—CH$_2$). $^{19}$F NMR (500 MHz, C$_6$D$_6$): δ −74.55 (m, 3F), −74.87 (m, 3F), −76.24 (m, 3F), −77.82 (m, 3F). $^{31}$P NMR (500 MHz, Tol-D$_8$): δ 12.50 (d, $^2J_{PP}$=12.90 Hz, $^1J_{P119Sn}$=414.19 Hz, 1P), 59.60 (d, $^2J_{PP}$=12.90 Hz, $^2J_{P119Sn}$=103.79 Hz, 1P). $^{119}$Sn NMR (400 MHz, THF-D$_8$, Me$_4$Sn): δ −488.2 (br, 1Sn). Anal. Calculated for C$_{34}$H$_{55}$F$_{12}$N$_3$O$_2$P$_2$Sn (Mol. Wt.: 946.47): C, 43.15; H, 5.86; N, 4.44. Found: C, 43.26; H, 6.01; N, 4.63. The structure was proven by X-ray analysis.

Example 6

Germanium(II), trans-bis[3-(di-tert-butylphosphino)-1,1,1-trifluoro-2-(trifluoromethyl)-2-propanolato-O,P]—

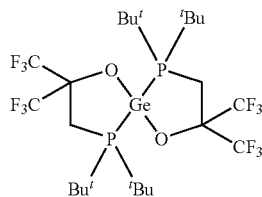

14.45 g (0.095 mol) of Lithium di-tert-butylphosphide, 18.81 g (0.105 mol) of 2,2-bis(trifluoromethyl)oxirane and 80 ml of THF were stirred at room temperature for 1 hour. Then 10.0 g (0.043 mol) of germanium(II) chloride dioxane complex (1:1) was added by one portion to the reaction mixture. The reaction mixture was stirred for 24 hours and the solvent was removed in 1-mm vacuum. The residue was redissolved in 100 ml of pentane. The LiCl was filtered off and the final product was purified by the recrystallizion from 50 ml of pentane at −30° C. Yield of germanium(II), trans-bis[3-(di-tert-butylphosphino)-1,1,1-trifluoro-2-(trifluoromethyl)-2-propanolato-O,P]—, was 14.3 g (46%) as a white solid with m.p. 186.2° C. (decomposition). $^1$H NMR (500 MHz, THF-D$_8$, TMS): δ 1.30 (s, 36H, Me), 2.35 (s, 4H, CH$_2$). $^{19}$F NMR (500 MHz, THF-D$_8$): δ −76.58 (s, 12F). $^{31}$P NMR (500 MHz, THF-D$_8$): δ 15.2 (S, 1P). Anal. Calculated for C$_{24}$H$_{40}$F$_{12}$O$_2$GeP$_2$ (Mol. Wt.: 723.14): C, 39.86; H, 5.58. Found: C, 40.03; H, 6.17. The structure was proven by X-ray analysis.

Example 7

Reaction of 1-azidoadamantane with germanium(II), trans-bis[3-(di-tert-butylphosphino)-1,1,1-trifluoro-2-(trifluoromethyl)-2-propanolato-O,P]—, to Produce Germanium(IV), trans-[3-(tert-butylphosphino)-1,1,1-trifluoro-2-(trifluoromethyl)-2-propanolato-κO,κP], [3-(P,P-di-tert-butyl-phosphinimyl)-1,1,1-trifluoro-2-(trifluoromethyl)-2-propanolato-κO, κN]—

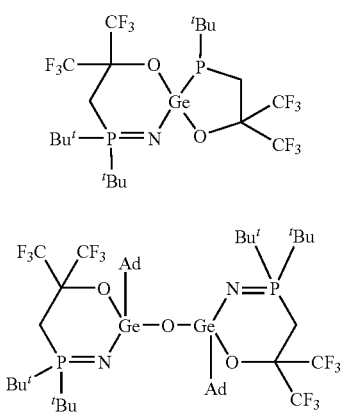

3.0 g (0.0042 mol) of Germanium(II), trans-bis[3-(di-tert-butylphosphino)-1,1,1-trifluoro-2-(trifluoromethyl)-2-propanolato-O,P]—, (example 6) and 1.6 g (0.0090 mol) of 1-azidoadamantane were stirred in 600 ml of toluene at 100° C. for 5 days. The solvent was removed in 1-mm vacuum and the residue was recrystallized from 50 ml of pentane. The first crop of the crystals was germanium(IV), trans-[3-(tert-butylphosphino)-1,1,1-trifluoro-2-(trifluoromethyl)-2-propanolato-κO,κP], [3-(P,P-di-tert-butyl-phosphinimyl)-1,1,1-trifluoro-2-(trifluoromethyl)-2-propanolato-κO, κN]—. Yield of the compound was 1.10 g (39%) as a white solid with m.p. 83.7° C. (decomposition). $^1$H NMR (500 MHz, C$_6$D$_6$, TMS): δ 1.20 (d, $^3J_{P,H}$=13.7 Hz, 9H, Me), 1.25 (d, $^3J_{P,H}$=13.6 Hz, 9H, Me), 1.29 (d, $^3J_{P,H}$=14.0 Hz, 9H, Me), 1.34 (d, $^3J_{P,H}$=14.1 Hz, 9H, Me), 2.40 (m, 2H, P—CH$_2$), 2.70 (m, 2H, P—CH$_2$). $^{19}$F NMR (500 MHz, C$_6$D$_6$): δ −77.25 (m, 3F), −80.57 (m, 3F), −81.00 (m, 3F), −82.93 (m, 3F). $^{31}$P NMR (500 MHz, THF-D$_8$): δ −69.99 (s, 1P), 42.27 (s, 1P). Anal. Calculated for C$_{20}$H$_{31}$F$_{12}$GeNO$_2$P$_2$ (Mol. Wt.: 680.03): C, 35.32; H, 4.59; N, 2.06. Found: C, 35.37; H, 4.73; N, 2.30. The structure was proven by X-ray analysis. The second crop was oxo-bis[adamantyl[3-(P,P-di-tert-butyl-phosphinimyl)-1,1,1-trifluoro-2-(trifluoromethyl)-2-propanolato-κO, κN] germanium(IV)]. Yield of the second compound 17 was 0.37 g (16%) as a white solid with m.p. 104.8° C. (decomposition). $^1$H NMR (500 MHz, THF-D$_8$, TMS): δ 1.15 (d, $^3J_{P,H}$=13.7 Hz, 18H, Me), 1.30 (d, $^3J_{P,H}$=13.8 Hz, 18H, Me), 1.68 (m, 12H, Adamantyl), 1.91 (m, 12H, Adamantyl), 2.10 (m, 6H, Adamantyl), 2.20 (m, 4H, P—CH$_2$). $^{19}$F NMR (500 MHz, THF-D$_8$): δ −79.80 (m, 3F), −80.60 (m, 3F). $^{31}$P NMR (500 MHz, THF-D$_8$): δ 39.02 (s, 2P).

Anal. Calculated for C$_{44}$H$_{70}$F$_{12}$Ge$_2$N$_2$O$_3$P$_2$ (Mol. Wt.: 1110.25): C, 47.60; H, 6.35; N, 2.52. Found: 47.64; H, 6.41; N, 2.58. The structure was proven by X-ray analysis. The residue from the recrystallizations was subjected to the chromatography on silica gel with the eluent petroleum ether/ethyl ether at 10/0.5. 2-[(P,P-Di-tert-butyl-N-adamantylphosphinimyl)methyl]-1,1,1,3,3,3-hexafluoropropan-2-ol was formed.

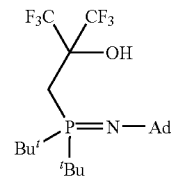

Yield of this compound was 1.03 g (26%) as a white solid with m.p. 82.43° C. (decomposition). $^1$H NMR (500 MHz, C$_6$D$_6$, TMS): δ 0.85 (d, $^3J_{P,H}$=12.8 Hz, 9H, Me), 0.94 (d, $^3J_{P,H}$=12.9 Hz, 9H, Me), 1.50 (m, 6H, Adamantyl), 1.70 (m, 6H, Adamantyl), 1.90 (m, 3H, Adamantyl), 2.20 (m, 2H, P—CH$_2$). $^{19}$F NMR (500 MHz, C$_6$D$_6$): δ −78.07 (m, 3F), −78.41 (m, 3F). $^{31}$P NMR (500 MHz, C$_6$D$_6$): δ 84.33 (s, 1P). Anal. Calculated for C$_{22}$H$_{36}$F$_6$NOP (Mol. Wt.: 475.49): C, 55.57; H, 7.63; N, 2.95. Found: C, 55.74; H, 7.69; N, 3.12. The structure was proven by X-ray analysis.

Polymerization Procedure

All test samples were prepared under a nitrogen atmosphere. The stock solutions were prepared so that the test concentrations were at a maximum of 10% of the concentration of the stock solution, i.e. 8% stock solution for the pre-catalyst to test at 7700 ppm. Samples were prepared by taking a known mass of the pre-catalyst and diluting it with butyl acetate until it reached a total mass for that of the desired percent. The starting materials for the gel time were measured out with 1.95 g of Desmodur®3300 and 4.74 g of Polyol. To this mixture was added the calculated amount of stock solution to produce the desired concentration of the pre-catalyst and the contents mixed. From this two samples are produced; one was left stirring under a nitrogen atmosphere and the other was left stirring exposed to air. The samples were checked frequently and the time it took for the samples to gel was recorded for both. The results are shown in the table below.

TABLE

Gel times under nitrogen and under air for compounds in the formation of polyurethanes.

| Entry | Compound | Concentration (ppm) | Time to gel under nitrogen (hrs) | Time to gel under air (hrs) |
|---|---|---|---|---|
| 1 | Ex. 1 | 1500 | 1.6 | 1.93 |
| 2 | Ex. 1 | 700 | 2.6 | 2.27 |
| 3 | Ex. 1 | 500 | 3.23 | 3.07 |
| 4 | Ex. 1 | 250 | 6.23 | 5.73 |
| 5 | Ex. 2 | 1800 | 1.46 | 0.96 |
| 6 | Ex. 2 | 1000 | 2.63 | 1.96 |
| 7 | Ex. 5 | 5000 | 11.0 | 11.0 |
| 8 | Ex. 5 | 500 | 19.0 | 19.0 |
| 9 | Ex. 6 | 4000 | 38.0 | 7.9 |
| 10 | ($^t$Bu$_2$P—CH$_2$—C(CF$_3$)$_2$OH | 1800 | 72.0 | 72.0 |
| 11 | No catalyst | N/A | 72.0 | 72.0 |

What is claimed is:

1. A process for making a polyurethane, comprising:
providing an isocyanate-comprising compound;
providing an isocyanate-reactive compound;
providing a catalyst of general formula A

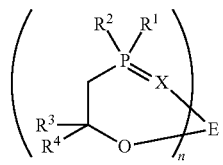

wherein
E is tin (Sn) or germanium (Ge);
X is oxygen, sulfur, nitrogen, substituted N, or a lone pair of electrons;
n is 2;
$R^1$ and $R^2$ are each independently H, C-4 to C-50 alkyl, C-6 to C-50 aryl, silyl, C-4 to C-50 substituted arylalkyl, C-6 to C-50 substituted alkylaryl, alkoxy, dialkylamino, or alkythio; and
$R^3$ and $R^4$ are each independently C-1 to C-20 alkyl, or C-1 to C-20 fluoroalkyl;
combining said isocyanate-comprising compound and said isocyanate-reactive compound in the presence of said catalyst; and
forming a polyurethane.

2. The process of claim 1, wherein E is germanium, and wherein the polyurethane has a gel time 5 times faster under aerobic conditions than under nitrogen at the same concentration of the catalyst of general formula A.

3. The process of claim 1 wherein the polyurethane has a gel time, which is 4 to 40 times faster than gel times of a polyurethane prepared in the absence of the catalyst of general formula A under aerobic conditions.

4. The process of claim 1 wherein said gel time for said polyurethane is increased from 2 times to 45 times that of said polyurethane made in the absence of the catalyst of general formula A under nitrogen.

5. A coating composition comprising a polyurethane made by the process of claim 1.

6. A substrate coated with a composition of claim 5.

* * * * *